US008105150B2

(12) United States Patent
Nguyen

(10) Patent No.: US 8,105,150 B2
(45) Date of Patent: Jan. 31, 2012

(54) GAMING MACHINE AND GAMING PROCESS INCLUDING FURTHER GAME SYMBOLS

(75) Inventor: Hung Ngoc Nguyen, Sefton (AU)

(73) Assignee: Aristocrat Technologies, Inc. NV (US)

( * ) Notice: Subject to any disclaimer, the term of this patent is extended or adjusted under 35 U.S.C. 154(b) by 502 days.

(21) Appl. No.: 12/340,147

(22) Filed: Dec. 19, 2008

(65) Prior Publication Data

US 2009/0181756 A1 Jul. 16, 2009

(30) Foreign Application Priority Data

Dec. 21, 2007 (AU) ................................ 2007907080

(51) Int. Cl.
*A63F 9/24* (2006.01)
*A63F 13/00* (2006.01)
*G06F 17/00* (2006.01)
*G06F 19/00* (2011.01)

(52) U.S. Cl. ................ 463/20; 463/16; 463/17; 463/18; 463/21

(58) Field of Classification Search ............. 463/16–18, 463/20–21
See application file for complete search history.

(56) References Cited

U.S. PATENT DOCUMENTS

| | | | | | |
|---|---|---|---|---|---|
| 5,152,529 | A * | 10/1992 | Okada | ............................. | 463/20 |
| 5,395,111 | A | 3/1995 | Inoue | | |
| 5,722,891 | A * | 3/1998 | Inoue | ............................. | 463/20 |
| 2003/0087690 | A1 | 5/2003 | Loose | | |

* cited by examiner

*Primary Examiner* — Jarrett Stark
(74) *Attorney, Agent, or Firm* — McAndrews, Held & Malloy, Ltd.

(57) ABSTRACT

A method for use with a gaming machine including presenting an outcome by displaying a symbol as travelling along a path and stopping in a stopping position that overlies another game symbol. An award is paid or changed when there is a particular relationship between the symbol.

16 Claims, 5 Drawing Sheets

GAMING MACHINE AND GAMING PROCESS INCLUDING FURTHER GAME SYMBOLS

RELATED APPLICATIONS

This application claims priority to Australian Provisional Patent Application No. 2007907080, having a filing date of Dec. 21, 2007, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention generally relates to gaming machines and methods of gaming. A particular embodiment of the present invention relates to gaming machine and associated methods that implement a spinning reel game.

BACKGROUND OF THE INVENTION

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming machines that are allowable, both in terms of the prevailing regulations and in terms of providing a return on investment to the gaming venue operators.

One type of gaming machine that has had considerable success is one that implements a spinning reel game. In a spinning reel game, a set of reels, typically between three and six reels are defined and one or more pay lines are defined across the reels. The player can wager on an outcome of the game, the outcome represented by the combinations of symbols along each pay line when the reels are shown in their stopped position. In some games the player can wager on one or more pay lines at their choice and normally the more pay lines that a player wagers on, the higher the total bet required. Also, players may be offered the choice to wager different amounts on each pay line, for example selecting between wagering one credit and two credits per pay line, with a wager of two credits resulting in a doubling of an award payable for a winning combination on the pay line.

The reels may be mechanical reels or representations of reels displayed on an electronic display. Only a portion of each of the reels is usually visible, with that portion displaying to a player of the gaming machine one or more symbols, each symbol being displayed in a symbol position of the display. The collection of symbol positions often define a matrix or other array. For example, a spinning reel game with five spinning reels that each have three symbols visible to the player when the reels are displayed in their stopped position may define a 3×5 matrix of symbols positions. In this type of game, the pay lines normally are defined so that each pay line includes five symbol positions, consisting of one and only one symbol position from each column in the matrix.

The reels normally have a fixed length, and outcomes of the game are represented by the stopping positions of the reels, which in turn define combinations of symbols along one or more pay lines that extend across the symbol positions. When a combination of symbols along a pay line defines a winning combination, as defined in the pay table and rules of the game, then an award is awarded to the player by the gaming machine.

Another type of spinning reel game has an individual reel for each displayed symbol position. In this type of game the pay lines may be defined across the symbol positions in any direction.

Another type of gaming machine provides a card-based game. In these types of games a plurality of cards are presented to a player to reveal a symbol on each card that represents an outcome of a game play. The cards often are presented in one or more hands and the cards in each hand may be displayed together, for example in symbol positions that are arranged to define a row of cards.

A still further type of game is a dice-based game. In these types of games, a plurality of dice are presented to a player with one or more faces shown to reveal one or more symbols on each die that represent the outcome of the game. Again, the dice are often presented in groups, for example in rows and/or columns, with outcomes defined across the displayed symbol positions, which in these games are the presented face(s) of each die.

BRIEF SUMMARY OF THE INVENTION

According to one aspect of the invention, there is provided a method for use with a gaming machine that is arranged to select symbols, present the selected symbols on a display and award an award if a winning outcome occurs, the method comprising determining an outcome of a wagering game played on the gaming machine and presenting the outcome by:

displaying a plurality of symbols in a plurality of symbol positions on a display dependent on a random selection process;

displaying at least one further symbol as travelling along a path and stopping in a stopping position that overlies at least one of the plurality of symbol positions;

wherein when there is a particular relationship between the at least one further symbol and one or more of the at least one of the plurality of symbols that the symbol overlies when in the stopping position, changing an award that would have been awarded if the particular relationship was not presented.

According to another aspect of the invention, there is provided a method for use with a gaming machine that is arranged to select symbols, present the selected symbols on a display and award an award if a winning outcome occurs, the method comprising determining an outcome of a wagering game played on the gaming machine and presenting the outcome by:

displaying a plurality of spinning reels that spin or are represented as spinning in a vertical plane as spinning and stopping to reveal a plurality of symbols that are carried by the reels, wherein the revealed symbols are determined dependent on a random selection process;

displaying at least one further symbol as travelling along a path and stopping in a stopping position that overlies at least one of the symbols revealed by the spinning reels, wherein the path occupies at least one plane that is different from the vertical plane in which the spinning reels spin or are represented as spinning;

wherein when there is a particular relationship between the at least one further symbol and one or more of the at least one of the plurality of symbols that the symbol overlies when in the stopping position, changing an award that would have been awarded if the particular relationship was not presented.

The at least one plane that is different from the vertical plane in which the spinning reels spin or are represented as spinning may be a horizontal plane, a plane located between the horizontal and vertical, or a vertical plane that is substantially transverse to the vertical plane in which the spinning reels spin or are represented as spinning.

According to another aspect of the invention, there is provided a gaming machine that provides a game in which a plurality of symbols are selected and presented on a display and if a winning combination occurs, the gaming machine awards an award, the gaming machine comprising a user interface in communication with a game controller that determines an outcome of a wagering game played on the gaming machine and presents the outcome on the display by:

displaying a plurality of symbols in a plurality of symbol positions on the display dependent on a random selection process;

displaying at least one further symbol as travelling along a path and stopping in a stopping position that overlies at least one of the plurality of symbol positions;

wherein when there is a particular relationship between the at least one further symbol and one or more of the at least one of the plurality of symbols that the symbol overlies when in the stopping position, the game controller awards a different award that would have been awarded if the particular relationship was not presented.

According to a further aspect of the invention, there is provided a gaming machine that provides a game in which a plurality of symbols are selected and presented on a display and if a winning combination occurs, the gaming machine awards an award, the gaming machine comprising a user interface in communication with a game controller that determines an outcome of a wagering game played on the gaming machine and presenting the outcome by:

displaying on the display or as part of the display a plurality of spinning reels that spin in a vertical plane and stop to reveal a plurality of symbols that are carried by the reels, wherein the revealed symbols are determined by the game controller dependent on a random selection process;

displaying on the display at least one further symbol as travelling along a path and stopping in a stopping position that overlies at least one of the symbols revealed by the spinning reels, wherein the path occupies at least one plane that is different from the vertical plane in which the spinning reels spin or are represented as spinning;

wherein when there is a particular relationship between the at least one further symbol and one or more of the at least one of the plurality of symbols that the symbol overlies when in the stopping position, changing an award that would have been awarded if the particular relationship was not presented.

In another aspect of the invention, there is provided a game controller programmed to implement any one of the methods described in the preceding paragraphs.

In another aspect of the invention, there is provided instructions that program a game controller to implement the method as described in the preceding paragraphs, when stored in a storage medium.

Further aspects of the present invention will be apparent from the following description, given by way of example and with reference to the accompanying drawings. Also, various embodiments of the aspects described in the preceding paragraphs will be apparent from the appended claims, the following description and/or the accompanying drawings.

DETAILED DESCRIPTION OF THE INVENTION

Figure 1:
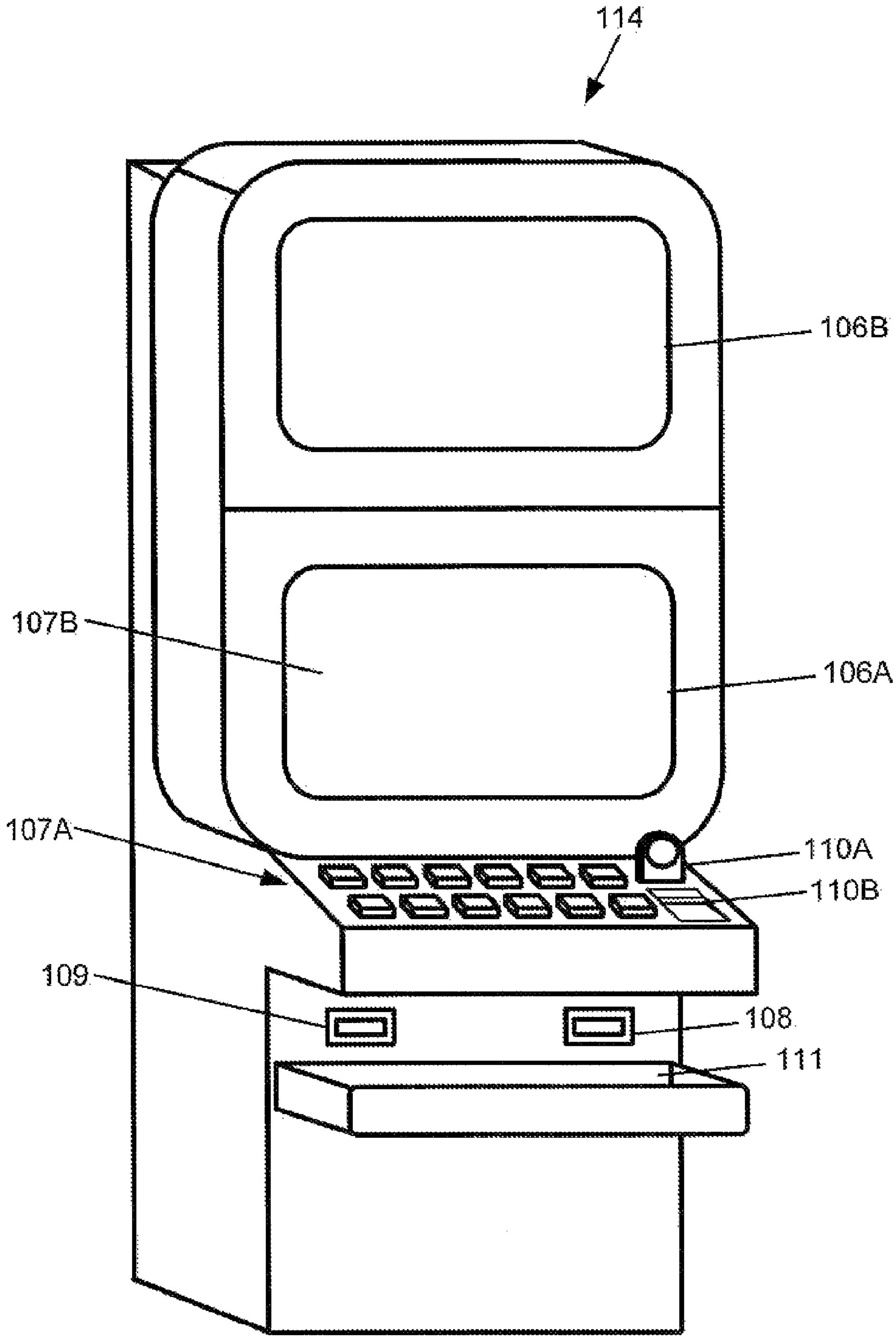
FIG. 1: shows diagrammatically, a view of a gaming console.

In FIG. 1 of the accompanying drawings, one example of a gaming console that is suitable to implement the present invention is generally referenced by arrow 114.

The gaming console 114 includes two displays 106A, 106B on one or both of which is displayed representations of a game that can be played by a player and a bank of buttons 107A and/or a touch screen 107B to enable a player to play the game. The displays 106 may be video display units, such as a cathode ray tube screen device, a liquid crystal display, plasma screen, any other suitable video display unit, or the visible portion of an electromechanical device. The display 106B may display artwork, including for example, pay tables and details of bonus awards and other information or images relating to the game. In alternative gaming consoles the display 106B may be omitted, optionally replaced by a static display.

A credit input including a coin input 110A and/or bill collector 110B allows a player to provide credit for wagering and a coin output 111 is provided for cash payouts from the gaming console 114. A card and/or ticket reader 108 and a printer 109 may be provided to provide player tracking, cashless game play or other gaming and non-gaming related functions.

Figure 2:
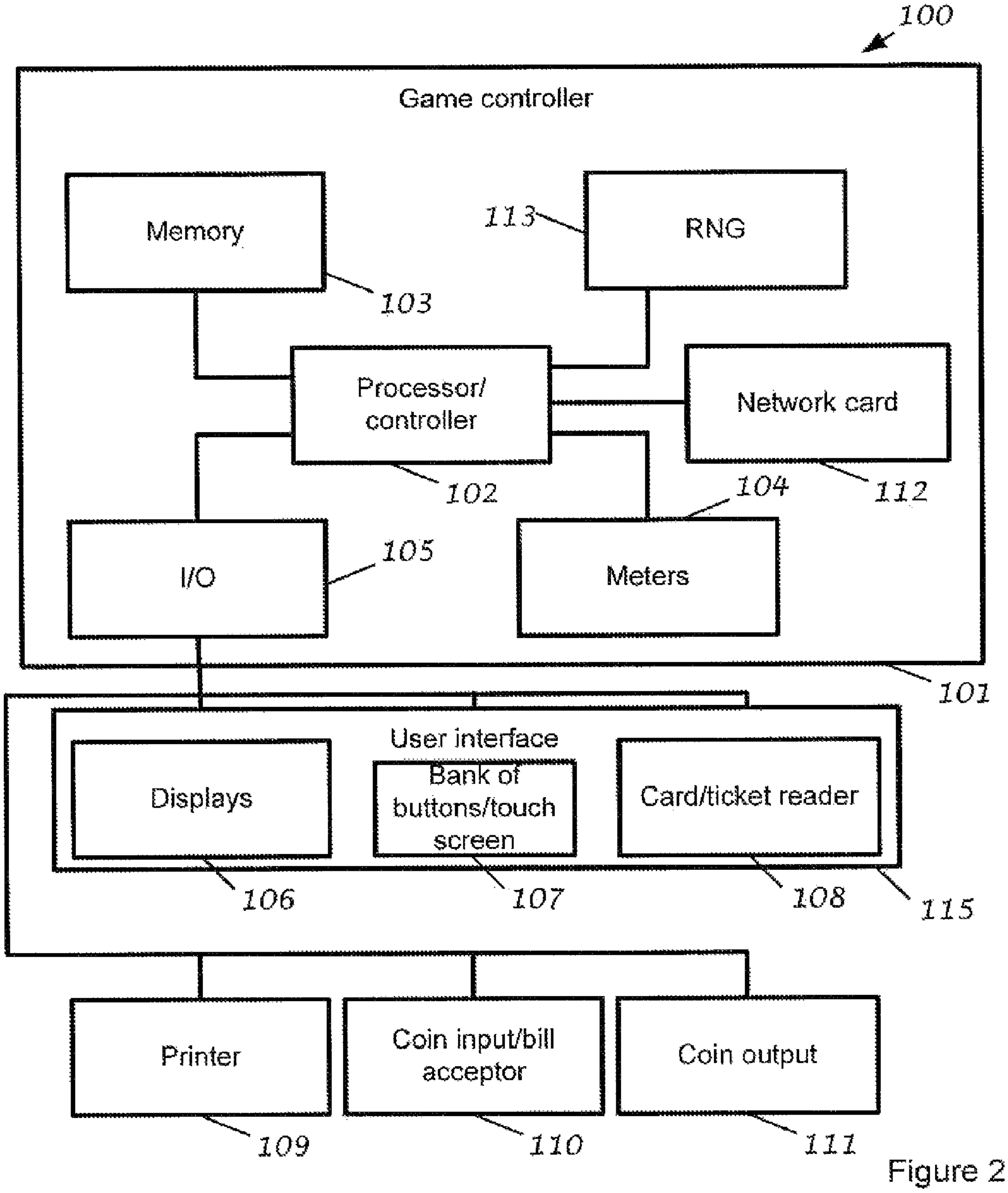
FIG. 2: shows a block diagram of a gaming machine.

FIG. 2 shows a block diagram of a gaming machine, generally referenced by arrow 100, suitable for implementing the present invention. The gaming machine 100 may include the gaming console 114 shown in FIG. 1 and accordingly like reference numerals have been used to describe like components in FIGS. 1 and 2.

The gaming machine 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms part of, the computational device 102. Typically, the gaming machine 100 will include both volatile and non-volatile memory and more than one of each type of memory, with such memories being collectively represented by the memory 103. The instructions to cause the game controller 101 to implement the present invention will be stored in the memory 103. The instructions and data for controlling operation of the computational device 102 may be stored on a computer readable medium from which they are loaded into the gaming machine memory 103. The instructions and data may be conveyed to the gaming machine by means of a data signal in a transmission channel. Examples of such transmission channels include network connections, the Internet or an intranet and wireless communication channels.

The game controller 101 may include credit meters 104, which may be implemented in hardware for the purposes of regulatory compliance and which may be implemented in software, and also include an input/output (I/O) interface 105 for communicating with the peripheral devices of the gaming machine 100. The input/output interface 105 and/or the peripheral devices may be intelligent devices with their own memory for instructions and data.

In the example shown in FIG. 2, the peripheral devices that communicate with the controller are the displays 106, bank of buttons/touch screen 107, the card and/or ticket reader 108, the printer 109, a bill acceptor and/or coin input 110 and a coin output 111. Additional devices may be included as part of the gaming machine 100, or devices omitted as required for the specific implementation.

The bank of buttons 107A and/or touch screen 107B together with one or both of the displays 106 may provide a user interface 115 through which the gaming machine 100 and player communicate. If a card/ticket reader 108 is provided, this may also form part of the user interface 115.

In addition, the gaming machine 100 may include a communications interface, for example a network card 112. The network card 112, may for example, send status information, accounting information or other information to a central controller, server or database and receive data or commands from the central controller, server or database. The network card 112 may also enable communication with a central player account, allowing cashless gaming. One or more of the peripheral devices, for example the card/ticket reader 108 may be able to communicate directly with the network card 112. The network card 112 and the I/O interface 105 may be suitably implemented as a single machine communications interface.

The game controller 101 may also include a random number generator 113, which generates a series of random numbers that are used by the computational device 102 to determine the outcomes of games played on the gaming machine 100.

The game controller 101 may have distributed hardware and software components that communicate with each other directly or through a network or other communication channel. The game controller 101 may also be located in part or in its entirety remote from the user interface 115. Also, the computational device 102 may comprise a plurality of devices, which may be local or remote from each other. Instructions and data for controlling the operation of the user interface 115 may be conveyed to the user interface 115 by means of a data signal in a transmission channel. The user interface 115 may be a computational device, for example a personal computer, used by a person to play a game provided from a remote game controller 101.

Figure 3:
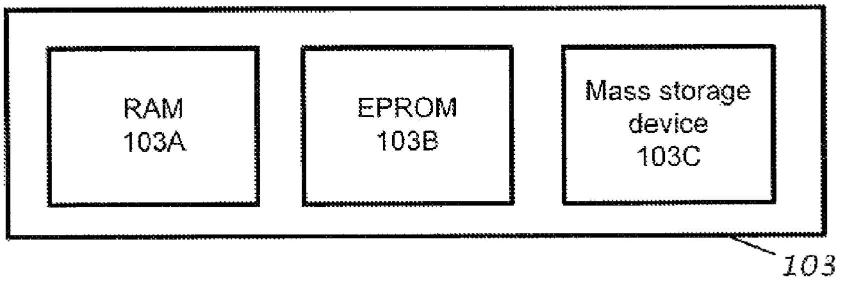
FIG. 3: shows a block diagram of components of the memory of the gaming machine represented in FIG. 2.

FIG. 3 shows an exemplary block diagram of the main components of the memory 103. The RAM 103A typically temporarily holds instructions and data related to the execution of game programs and communication functions performed by the computational controller 102. The EPROM 103B may be a boot ROM device and/or may contain system and game related code. The mass storage device 103C may be used to store game programs, the integrity of which may be verified and/or authenticated by the computational controller 102 using protected code from the EPROM 103B or elsewhere.

Figure 4:
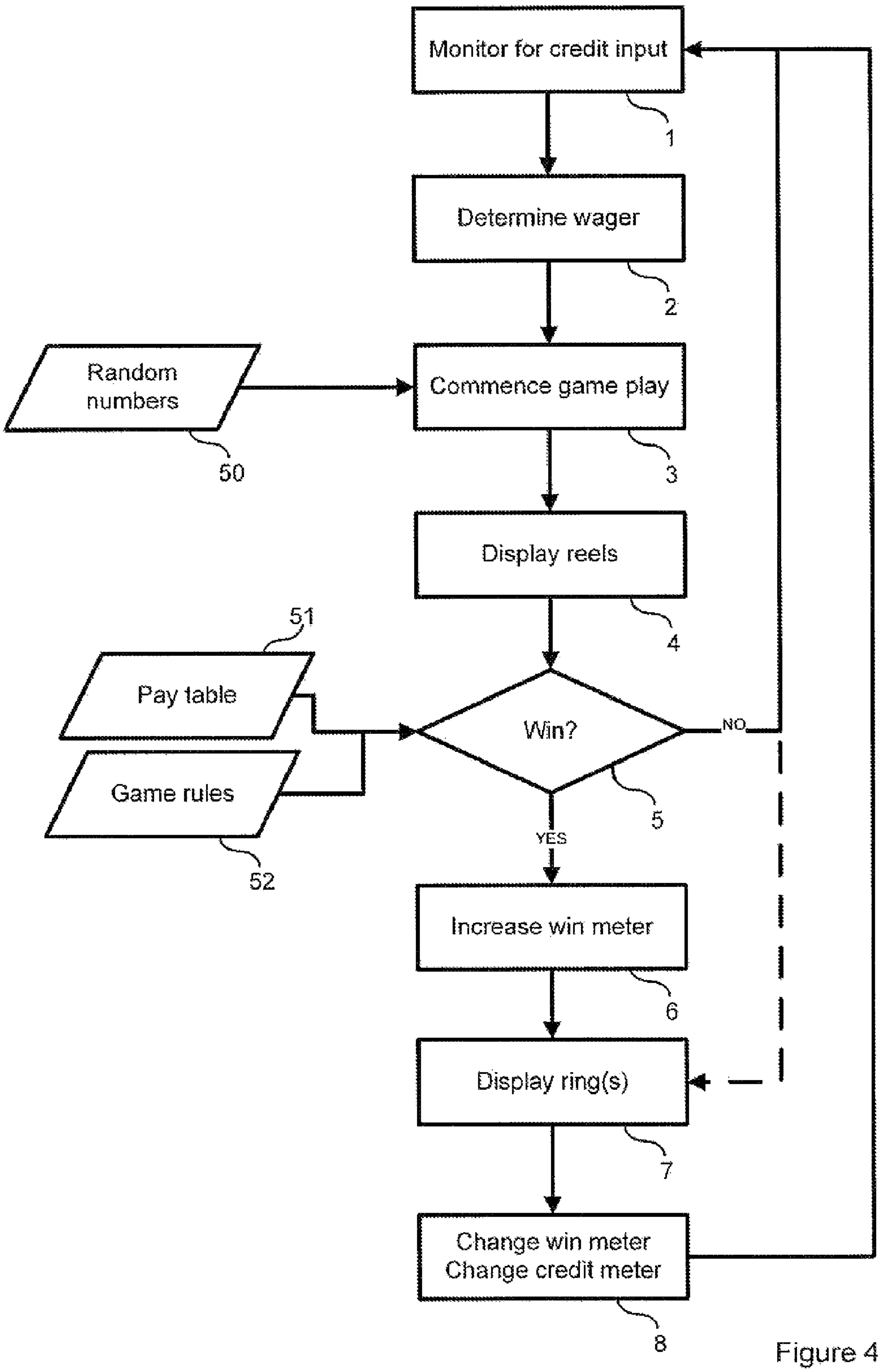
FIG. 4: shows a flow diagram of a process that may be implemented by the gaming machine of FIG. 2.

FIG. 4 shows a process flow diagram of a process performed in accordance with an embodiment of the present invention. The process may be performed by the various implementations of gaming machine 100 described herein above.

In step 1, the game controller 101 monitors the bill acceptor and/or coin input 110 and/or information received by the card/ticket reader 108 or network card 112 for a deposit of credit and in response causes the credit meters 104 to increment according to the denomination of the game. The game controller 101 then monitors the user interface 107 for the input of a wager (step 2). In one embodiment, the user interface 107 includes a button in the bank of buttons that indicates that the player wishes to make an ante-bet to be eligible to win an additional award.

The additional award may be any award over and above that which would otherwise be awarded to a player, which in one embodiment may include an award of zero and in another embodiment eligibility to win the additional award may be dependent on a win in the underlying game.

For example, the additional award may be a fixed value that is added to any award that would otherwise be awarded. The additional award may instead modify an existing award. For example an award that would have been paid if the player had not staked the ante-bet may be doubled because of the ante-bet. In this instance, the magnitude of the additional award is variable. Where the player can select the number of credits to wager per outcome, which may be in the form of symbols along a pay line in a spinning reel game, or symbols in a hand in a card style game, then the required ante-bet to be eligible to win the additional award may be either fixed or increase with the credits per outcome, depending on what additional award the player is eligible for when the ante-bet is staked.

In another embodiment, no ante-bet is required, in which case eligibility for the additional awards referred to may form a part of the determination of the overall return to player of the gaming machine. In still other embodiments, a range of ante-bets may be provided, with a larger ante-bet increasing the chance of an additional award and/or resulting in eligibility for larger additional awards.

If there are sufficient credits in the meters 104 to support the wager, a game play is commenced in step 3 by the game controller 101 receiving one or more random numbers 50 from the RNG 113 that indicate the outcome of the game. The outcome is then presented on the display 106 (step 4), which may be an electronic display or the visible part of a collection of physical spinning reels. The presentation reflects the type of game, showing symbols on reels in the case of a spinning reel game, symbols on revealed cards in a card game, or symbols on a group of dice in a dice game.

Figure 5:
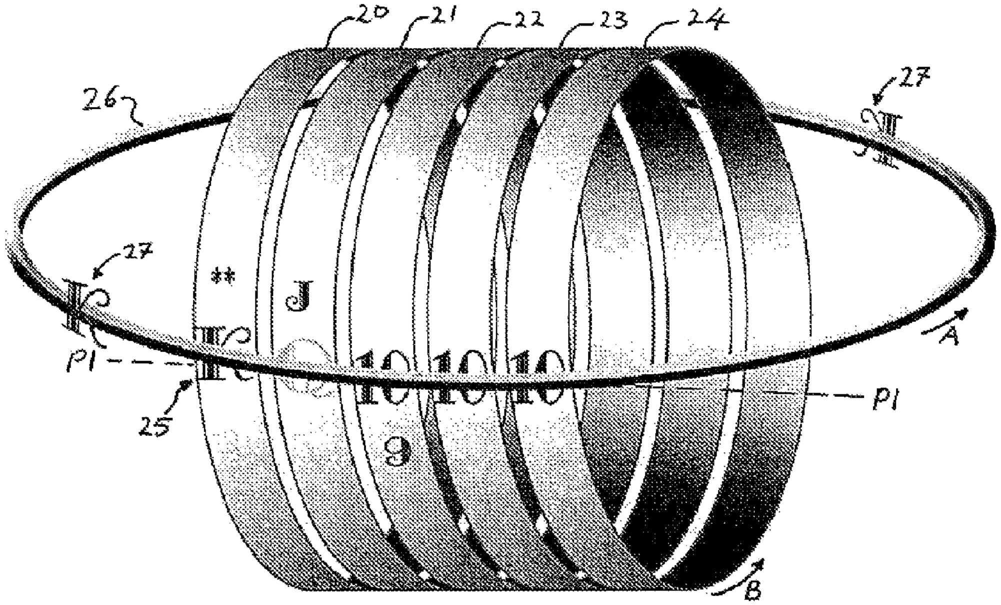
FIGS. 5 to 8: show various embodiments of the presentation of outcomes of a game that may be implemented by the gaming machine of FIG. 2.

FIG. 5 shows diagrammatically one embodiment of the presentation of a game implemented by a gaming machine 100 of the present invention. In this embodiment, the gaming machine 100 implements a spinning reel game having five reels 20-24, each of which have on them symbols 25 (one only indicated by a reference numeral in FIG. 5). Although each reel 20-24 is shown with only one or two symbols on it, in practice each reel will contain a full set of symbols.

The stopping position of the reels 20-24 for each game play is determined based on the random numbers 50 from the RNG 113, for example by referring to a table defined in the memory 103 that matches ranges of numbers within the range of the RNG 113 with stopping positions. One pay line P1 is shown in FIG. 5, which may be the sole pay line of the game, or which may be one of a plurality of pay lines. If the reels 20-24 stopped to reveal the symbols in the symbol positions along the pay line P1 as shown in FIG. 5, then the combination of symbols read from left to right is 'K' 'Q' '10' '10' '10'.

Whether this is a winning combination is determined in step 5. This determination is in accordance with a pay table 51 and the rules of the game 52 (see FIG. 4). For example, the pay table 50 may only include awards for combinations of three or more like symbols and the rules of the game may specify that the combinations can only be formed by reading the symbols from left to right starting at the left most reel. If this was the case, then the combination of symbols shown in FIG. 5 along pay line P1 would not be a winning combination.

Alternatively, if the rules specified that the gaming machine 100 paid for combinations read from right to left, then three '10' symbols are shown on pay line P1 and the award specified by the pay table 50 would be awarded by the gaming machine 100. For example where the award is an award of credits, the credits may be awarded by incrementing a win meter (step 6) and following any intervening game events, including in this embodiment step 7 and optionally also providing an option to 'double or nothing' or similar, or playing a feature game, incrementing a credit meter 104. The credit in the credit meter 104 may then be available for subsequent wagers, or may be cashed out of the gaming machine 100, which may end the gaming session.

In one embodiment, if the spinning reels 20-24 do not represent a winning outcome, then the process returns to step 1 and the gaming machine 100 monitors for further credit input and in step 2 monitors for the next wager. Alternatively, as indicated by the dashed line from step 5 in FIG. 5, the process proceeds to step 7, giving at least the appearance of a second chance to win.

In step 7 the gaming machine 100 displays on the display 106 a ring 26. This ring (and/or any other rings) may not have been previously displayed on the display 106. Alternatively, this ring may be displayed while the reels were displayed (step 4) and could be always displayed when the reels 20-24 are displayed.

The ring 26 has on it two symbols 27, which in this example are both 'K' symbols. The ring 26 may be implemented as a physical ring that travels along a path in a horizontal plane so that symbols 27 travel in a circuit defined by the ring 26 about the reels 20-24. In this embodiment, the ring 26 may act in a similar manner to the spinning reels 20-24 if implemented as physical spinning reels, but located in a different plane. Alternatively the ring 26 may be represented electronically on the display 106, which provides additional flexibility in how the ring 26 may be presented and move. The ring 26, although shown as an ellipse, may be any required shape and the use herein of the term 'ring' is not intended to limit the presentation of the ring to circular or otherwise curved profiles. The path defined by the ring 26 may be fixed for each game play so that player knows the path the symbols 27 travel.

The symbols 27 on the ring 26 may be represented as travelling anti-clockwise when viewed from above, as indicated by arrow A, and then stopping. The ring 26 occupies a different plane to the reels 20-24, which in FIG. 5 are shown to occupy a vertical plane and travel in that plane as indicated by arrow B. The stopping position of the ring 26 may have already been determined from the random numbers 50. Alternatively, one or more additional numbers may be received from the RNG 113 to determine the stopping position of the ring 26.

Figure 8:
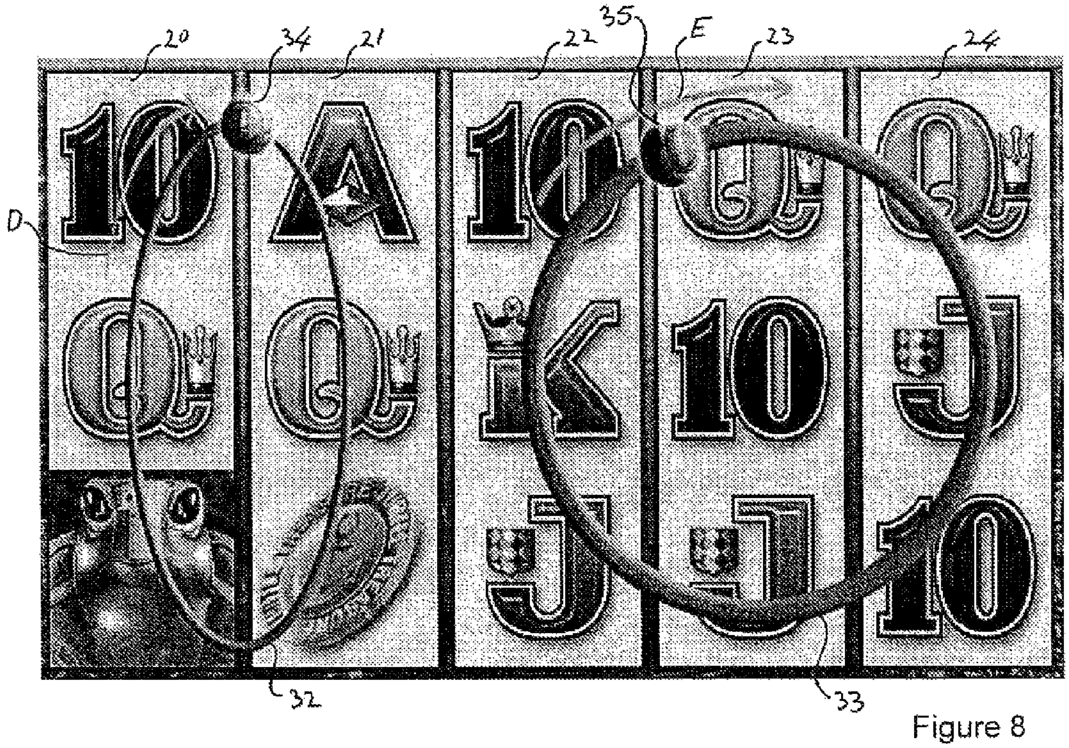

At least one of the possible stopping positions of the ring 26 places one of the symbols 27 over the top of a symbol 25. According to the pay table 51 and game rules 52, additional prizes are awarded when there is a certain combination of symbols 26 and 27. A large amount of flexibility may be provided to game designers as to what combinations result in an additional prize, including:

- If the symbol 27 matches the underlying symbol 25, then an additional award is paid;
- If the symbol 27 matches the underlying symbol 25 and that underlying symbol 25 forms part of a winning combination, then an additional award is paid;
- The symbol 27 may be treated as replacing the underlying symbol 25 and an additional award awarded if the combination of symbols as replaced by the underlying symbol 25 represents a winning combination;
- The symbol 27 may change the function of the underlying symbol, for example referring to FIG. 8, the occurrence of a ball stopping on a position makes the underlying symbol WILD.

As previously mentioned, the outcome of the game represented by the stopping of the ring 26 in a particular location may be determined by the random number(s) received from the RNG 113 in step 3.

In step 8 the gaming machine 100 evaluates the win with the new outcomes created by the outcome of the ring feature and displays the appropriate change, it then modifies the win meter dependent on any changes due to the outcome presented in step 7, and changes the value in the credit meter by the amount in the win meter. The process then returns to step 1.

Taking the combination shown in FIG. 5 and assuming that a prize of 5 credits is awarded if the symbol 27 matches an underlying symbol 25 and that the game rules specify that an additional award may be awarded whether or not the reels 20-24 reveal a winning combination.

The symbol on the ring may be variable, so as to match or otherwise form a winning association with a symbol on the reels 20-24. In this way, if a 'K' symbol does not appear along the path of the ring 26, the symbol on the ring 26 may change to match a symbol that is along the path. Alternatively, the game may be designed so that the symbol on the ring is fixed, with the possibility of combinations occurring on the reels 20-24 that would not result in an additional award regardless of where the ring 26 stops. In this case the ring 26 may not be displayed or may not rotate, so as to avoid the player perceiving the operation of the ring 26 as being an exercise in futility.

If the ring 26 presents more than one different symbol and the game design requires that a single combination of stopping positions on the reels could result in any of two or more of the symbols, then different outcomes for the ring 26 can be defined within the range of numbers allocated to the stopping position of the reels. For example, if the ring 26 had a 'K' and a 'Q' symbol on it and a range of 10 numbers was allocated to the stopping positions of the reels shown in FIG. 5, then three numbers in the range may be allocated to an outcome of matching 'K' symbols and four numbers allocated to an outcome of matching 'Q' symbols. The other three outcomes may result in no win. In other embodiments, the ring 26 may result in an award for all numbers in the range.

Figure 6:
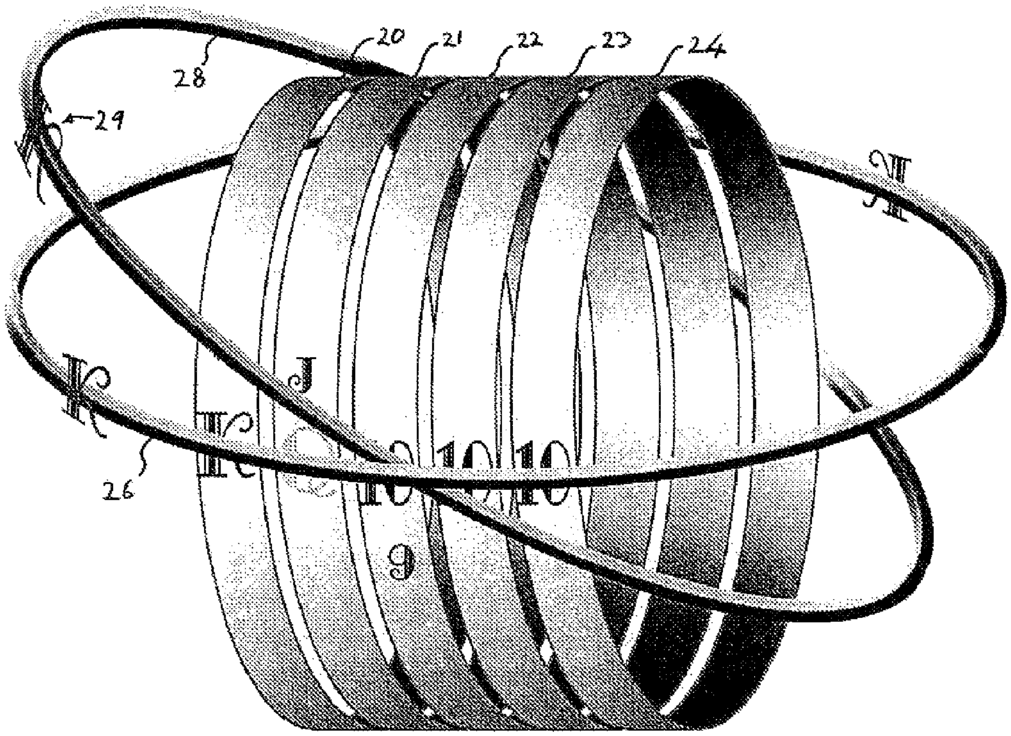

FIG. 6 shows an alternative embodiment, which includes a slanting ring 28 in addition to the reels 20-24 and the ring 26. If the reels 20-24 present on the display 106 symbol positions in a 3×5 matrix, the slanting ring 28 may be provided at an angle so that it travels substantially through the centre of the symbol positions in row 1, column 1, row 2, column 3 and row 3, column 5. The game rules 52 may specify that the symbol 29 on the ring 28 is only effective when it stops over one of these three symbol positions. In this case, the ring 28 may never stop in a position with a symbol over the reels 20-24 other than in one of these three locations.

Alternatively, the slanting ring 28 may stop with a symbol 29 over one of columns 2 and 4, in which case the symbol 29 will be located between rows 1 and 2 or rows 2 and 3 respectively. This may represent an outcome without an additional award. Alternatively, one or both the symbol positions that the symbol 29 is located between may be eligible to match with the symbol 29 to present an outcome that awards an additional award.

The operation of the slanting ring 28 may otherwise be the same as or similar to the operation of the ring 26 described in relation to FIG. 5.

The slanting ring 28 may be provided in addition to the ring 26 as shown in FIG. 6, or alternatively may be provided instead of the ring 26. Also, more than one slanting ring may be provided.

In one embodiment, a game may be provided that includes interaction between two or more rings. For example, referring to FIG. 6, a game event such as the awarding of a particular prize may occur if a 'K' symbol from ring 26 stops so as to overly a 'K' symbol on the ring 29. The prize may or may not be dependent on both rings overlying a 'K' symbol on the reels, or a different prize may be awarded if the two ring symbols overly a 'K' symbol on the reels than if they do not. The game event that occurs on interaction between the rings may be dependent on the interaction occurring somewhere over the area of the reels 20-24, may be dependent on the interaction occurring somewhere on the visible part of a display, for example either over or beside the reels 20-24, or in other embodiments may occur anywhere in the 3-dimensional space about the reels (or virtual 3-dimensional space in the case of a video display). Where the interaction occurs in a location not visible to the player, then the interaction may be presented to the player somehow, for example by a light flashing, or by a video sequence or animation being displayed. Where an electronic display is used, the reels 20-24 and rings 26, 29 may animate to rotate around a vertical axis to reveal where the interaction between the rings 26, 29 occurred. In yet other embodiments, one or both of the rings may interact with the rear face of the reels 20-24, for example to double the probability of a symbol on a ring overlying a relevant symbol on the reels.

Figure 7:
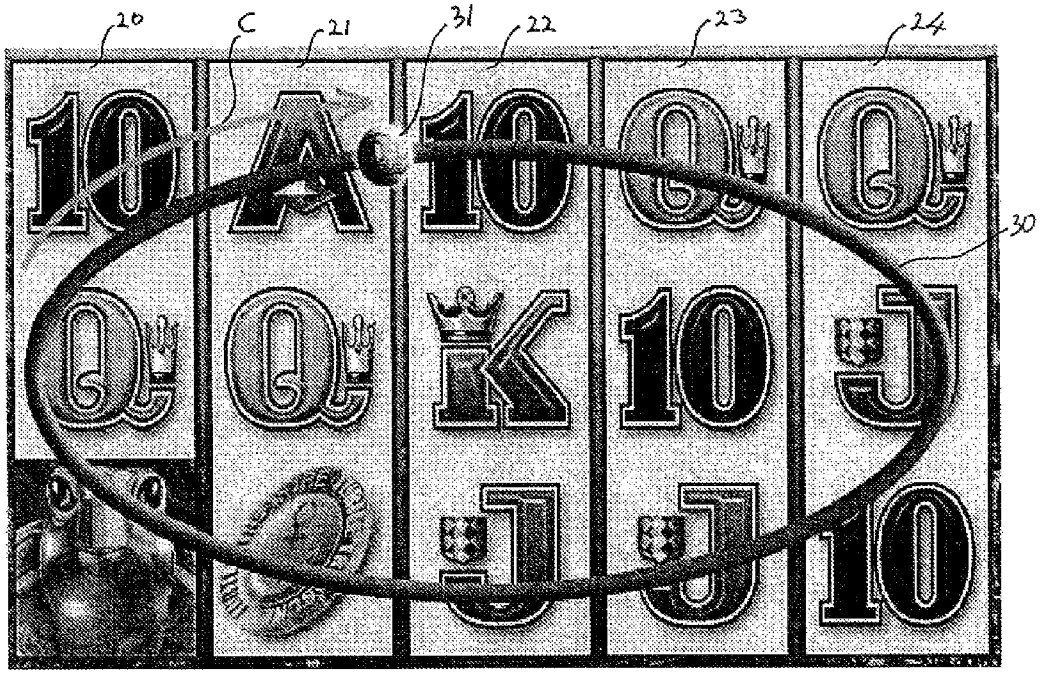

FIG. 7 shows another alternative embodiment, with a vertical ring 30 that carries a symbol 31. The vertical ring 30 may be provided in addition to, or instead of either or both of the ring 26 and slanting ring 29.

In this example the vertical ring 30 is shown as defining a path that is entirely in front of the symbol positions that are presented by the reels 20-24. Accordingly, the vertical ring 30 is also located in a vertical plane, but one that is transverse to how the reels 20-24 are presented. The symbol 31 travels clockwise about the vertical ring 30 as indicated by arrow C. The symbol 31 may stop over any of the positions in row 1, columns 2, 3 or 4, row 2, columns 1 or 5, and row 3, columns 2, 3 or 4 of the matrix defined by the symbol positions presented by the reels 20-24. Otherwise, the vertical ring 30 may operate in a similar manner as the ring 26 or slanting ring 28.

FIG. 8 shows another alternative embodiment, with two vertical rings 32, 33 that each carry a symbol 34, 35 respectively and travel clockwise as indicated by arrows D and E. Either or both of the vertical rings 32, 33 may be provided in addition to, or instead of any one of the ring 26, the slanting ring 29 and the vertical ring 30. Where more than one ring is provided, then the gaming machine may require different levels of ante-bet to 'activate' a ring. In other words, for example, by placing a minimum ante-bet, the player may be eligible for the awards for ring 26 only, whereas by placing a maximum ante-bet, the player may be eligible for the awards for the rings 26, 29, 30, 32, 33. Different ante-bets may therefore have different mappings of random numbers.

In the example in FIG. 8, the symbol 34 may stop over any of the positions in columns 1 and 2 of the matrix defined by the symbol positions presented by the reels 20-24 and the symbol 35 may stop over any of the positions in columns 3 to 5 except row 2, column 4. Otherwise, the vertical rings 32, 33 may operate in a similar manner as the ring 26, slanting ring 28, and vertical ring 30.

In the embodiments shown in FIGS. 7 and 8 the symbol carried by the ring does not match a symbol carried by the reels 20-24. In this embodiment the symbol carried by the ring may be presented as modifying the underlying symbol. Alternatively, the symbol on the ring may stop in a position over a reel 20-24 and then transform into a symbol that is carried by the reels 20-24. Which symbol the ring transforms into may be determined by what random number was generated by the RNG 113, with different symbols for the rings associated with different numbers associated with the stopping position of the reels.

While in the embodiments shown in FIGS. 7 and 8 the rings 20, 32, 33 are confined to within the area occupied by the reels 20-24, the rings may extend beyond the periphery of the reels 20-24. It may be possible for the symbols 31, 34, 35 to stop in a position in front of the reels and to the side of the reels. It is anticipated that when available, this would be used to represent an outcome without an additional award.

The symbols presented on the rings 26, 29, 30, 32, 33 may change as the rings move. Although the final form of the symbol may be determined in advance in accordance with the mapping of the number from the RNG 113, this may create the appearance of a triple random selection process, the first selection determining the stopping position of the reels, the second selection determining the stopping position of the ring(s) and the third determining the symbol displayed by the ring(s), if any. These selection processes may be presented on the display 106 in any order.

In alternative embodiments, the stopping position of the ring(s) and the symbol presented by the ring(s) if variable may be determined by the generation of separate random numbers 50 from those used to determine the stopping position of the reels. Whereas in the previous embodiments the game may be designed so that there is a relationship between the stopping positions of the reels 20-24 and where the ring(s) may stop, where there are separate determinations, the stopping position of the reels 20-24 may be independent of the stopping position of the ring(s).

In an alternative embodiment, a symbol on a ring may operate to overlie more than one symbol on a reel 20-24. In this embodiment, for example, an additional award may be provided if any one of the symbols on the reels 20-24 overlaid by the symbol on a ring matches the symbol on that ring.

Although the foregoing description has focussed on a spinning reel game, the ring(s) may be provided on other styles of games. For example in a card or dice game, the cards or dice may be presented in a 3 by 5 matrix, in which case the rings may operate in a similar as described herein for the spinning reel games.

In still further alternative embodiments, one or more of the reels 20-24 may have blank positions and the ring(s) may have one or more symbols that stop in the blank position when it occurs. Providing this in combination with variable symbols on the rings may build suspense in the game, as the gaming machine presents images representing a multi-stage selection processes, with the final outcome of the game only being revealed at the end of the process.

The examples described previously herein present the symbols 25 in a matrix. In alternative embodiments, the symbols 25 may be presented in other arrays, or in an arrangement that does not have a regular pattern. The path of the ring(s) may be adjusted to suit the arrangement of the symbols 25.

Also, the examples described previously herein have rings that generally occupy a single plane. However, in other embodiments the rings may occupy more than one plane. For example, a single ring may be defined by taking half of the ring 26 and half of the slanting ring 29.

The rings 26, 29, 30, 32, 33 may move in any required manner. As previously described, they may 'spin' like a spinning reel and stop in a randomly selected position. Alternatively, a ring or each of the rings may move in a step-wise manner. In this embodiment, for example, the ring may rotate one space, or in other words move so that the symbol would overly one reel 20-24 and then the next reel 20-24, on each spin of the reels 20-24. In another alternative, a ring or each of the rings may rotate, with the player hitting a 'stop' button. This could for example be performed after the reels 20-24 have stopped rotating, which may provide an element of skill to the game, or the appearance of an element of skill, namely hitting the stop button at the right time to cause a winning interaction of symbols involving the ring(s).

Still further, while the ring(s) have been described herein as associated with either an additional award or no additional award, in alternative embodiments, the ring may be associated with negative awards/penalties. For example, the ring may result in the loss of a winning outcome shown on the reels.

While the foregoing description has been provided by way of example of implementations that utilise gaming machines of the type found in casinos, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method for use with a gaming machine that is arranged to select symbols, present the selected symbols on a display and award an award if a winning outcome occurs, the method comprising determining an outcome of a wagering game played on the gaming machine and presenting the outcome by:

displaying a plurality of symbols in a plurality of symbol positions on a display dependent on a random selection process; and displaying at least one further symbol as travelling along a path and stopping in a stopping position that overlies at least one of the plurality of symbol positions; and wherein when there is a particular relationship between the at least one further symbol and one or more of the at least one of the plurality of symbols that the symbol overlies when in the stopping position, changing an award that would have been awarded if the particular relationship was not presented; and wherein the plurality of symbol positions are presented in a substantially vertical plane so that the symbols are presented facing the front of the symbol positions and the path of a said further symbol is located in a substantially horizontal plane so that the path is presented as traversing in front of and behind the plurality of symbol positions.

2. The method of claim 1, wherein the particular relationship is the matching of a said further symbol with a symbol that it overlies.

3. The method of claim 1, wherein at least one said stopping position for a said further symbol is located so as to not overlie any of the plurality of symbol positions.

4. The method of claim 1, further comprising requiring the staking of an ante-bet by a player of the gaming machine before the player is eligible for said changing of an award.

5. A method for use with a gaming machine that is arranged to select symbols, present the selected symbols on a display and award an award if a winning outcome occurs, the method comprising determining an outcome of a wagering game played on the gaming machine and presenting the outcome by:

displaying a plurality of symbols in a plurality of symbol positions on a display dependent on a random selection process; and displaying at least one further symbol as travelling along a path and stopping in a stopping position that overlies at least one of the plurality of symbol positions; and wherein when there is a particular relationship between the at least one further symbol and one or more of the at least one of the plurality of symbols that the symbol overlies when in the stopping position, changing an award that would have been awarded if the particular relationship was not presented; and wherein the plurality of symbol positions are presented in a substantially vertical plane so that the symbols are presented to the front of the symbol positions and the path of a said further symbol is located in another plane located between the horizontal and vertical so that the path is presented as traversing in front of and behind the plurality of symbol positions.

6. The method of claim 5, wherein the particular relationship is the matching of a said further symbol with a symbol that it overlies.

7. The method of claim 5, wherein at least one said stopping position for a said further symbol is located so as to not overlie any of the plurality of symbol positions.

8. The method of claim 5, further comprising requiring the staking of an ante-bet by a player of the gaming machine before the player is eligible for said changing of an award.

9. A method for use with a gaming machine that is arranged to select symbols, present the selected symbols on a display and award an award if a winning outcome occurs, the method comprising determining an outcome of a wagering game played on the gaming machine and presenting the outcome by:

displaying a plurality of symbols in a plurality of symbol positions on a display dependent on a random selection process; and displaying at least one further symbol as travelling along a path and stopping in a stopping position that overlies at least one of the plurality of symbol positions; and wherein when there is a particular relationship between the at least one further symbol and one or more of the at least one of the plurality of symbols that the symbol overlies when in the stopping position, changing an award that would have been awarded if the particular relationship was not presented; and wherein the plurality of symbol positions are presented in a substantially vertical plane so that the symbols are presented to the front of the symbol positions and the path is located in a substantially vertical plane so that the path is presented as traversing entirely in front of the plurality of symbol positions.

10. The method of claim 9, wherein the particular relationship is the matching of a said further symbol with a symbol that it overlies.

11. The method of claim 9, wherein at least one said stopping position for a said further symbol is located so as to not overlie any of the plurality of symbol positions.

12. The method of claim 9, further comprising requiring the staking of an ante-bet by a player of the gaming machine before the player is eligible for said changing of an award.

13. A method for use with a gaming machine that is arranged to select symbols, present the selected symbols on a display and award an award if a winning outcome occurs, the method comprising determining an outcome of a wagering game played on the gaming machine and presenting the outcome by:

displaying a plurality of spinning reels that spin or are represented as spinning in a vertical plane as spinning and stopping to reveal a plurality of symbols that are carried by the reels, wherein the revealed symbols are determined dependent on a random selection process;

displaying at least one further symbol as travelling along a path and stopping in a stopping position that overlies at least one of the symbols revealed by the spinning reels, wherein the path occupies at least one plane that is different from the vertical plane in which the spinning reels spin or are represented as spinning; and wherein when there is a particular relationship between the at least one further symbol and one or more of the at least one of the plurality of symbols that the symbol overlies when in the stopping position, changing an award that would have been awarded if the particular relationship was not presented; and wherein there are a plurality of said further symbols, each of which travel along respective paths that intersect each other and wherein a game event occurs when a plurality of said further symbols are displayed with one overlying the other.

14. The method of claim 13, wherein the at least one plane that is different from the vertical plane in which the spinning reels spin or are represented as spinning is a horizontal plane.

15. The method of claim 13, wherein the at least one plane that is different from the vertical plane in which the spinning reels spin or are represented as spinning is a plane located between the horizontal and vertical.

16. The method of claim 13, wherein the at least one plane that is different from the vertical plane in which the spinning reels spin or are represented as spinning is a vertical plane that is substantially transverse to the vertical plane in which the spinning reels spin or are represented as spinning.

* * * * *